United States Patent [19]

Kieronski et al.

[11] 4,099,609
[45] Jul. 11, 1978

[54] BOBBIN ELEVATING CONVEYOR AND ORIENTOR

[75] Inventors: John P. Kieronski, Charlotte; Francis N. Williams, Gastonia; Leo J. Smith, Charlotte, all of N.C.

[73] Assignee: Whitin Machine Works, Inc., Charlotte, N.C.

[21] Appl. No.: 617,064

[22] Filed: Sep. 26, 1975

[51] Int. Cl.² .............................................. B65G 43/08
[52] U.S. Cl. ........................................ 198/395; 193/47; 198/397; 198/399; 198/401; 221/161
[58] Field of Search ............... 198/244, 248, 249, 251, 198/252, 253, 254, 261, 276, 285, 288, 236, 267, 257, 395, 398, 399, 401, 376, 379, 397; 221/159, 160, 161; 209/90; 193/47

[56] References Cited

U.S. PATENT DOCUMENTS

| | | | |
|---|---|---|---|
| 2,649,214 | 8/1953 | Kirby et al. | 221/160 |
| 2,689,647 | 9/1954 | Hofstetter et al. | 209/90 |
| 3,031,059 | 4/1962 | Ingham | 198/288 |
| 3,067,852 | 12/1962 | Barr | 221/159 X |
| 3,328,948 | 7/1967 | DuBuis et al. | 198/244 X |
| 3,712,451 | 1/1973 | Vignon | 198/287 |
| 3,876,064 | 4/1975 | Morton | 198/287 |

*Primary Examiner*—Evon C. Blunk
*Assistant Examiner*—Douglas D. Watts
*Attorney, Agent, or Firm*—McNenny, Pearne, Gordon, Gail, Dickinson & Schiller

[57] ABSTRACT

Bobbin handling apparatus including means for feeding bobbins from a supply station in random end orientation to a delivery station for use by a doffing machine. The bobbin handling apparatus is conveniently mounted on the doffing machine, and includes means for sorting bobbins of one end orientation from the other and means to reorient bobbins of the one orientation to the other for presentation to the doffing machine of bobbins of a single orientation. The handling apparatus includes a bobbin supply box adapted to be manually positioned on and removed from the apparatus immediately above floor level, thereby requiring minimum physical effort.

8 Claims, 6 Drawing Figures

BOBBIN ELEVATING CONVEYOR AND ORIENTOR

BACKGROUND OF THE INVENTION

The invention relates to handling apparatus for bobbins used in spinning frames and the like, and more particularly to apparatus for conveying and aligning such bobbins.

PRIOR ART

Automatic doffing machines for servicing spinning frames require a source of empty bobbins for replacing full bobbins at successive spindles. Generally, the mechanism of conventional doffing machines requires that the bobbins be presented in a uniform orientation, i.e., with the head and butt ends of successive bobbins having the same relative orientation at a point from which they are individually gripped and moved onto a spindle. To conserve floor space and allow operation in areas of limited clearance, automatic doffing machines are often arranged with their various components in a vertical structure, and delivery of empty bobbins at an elevated level may be required. Loading of a magazine or box of empty bobbins at a position well above floor level may be relatively strenuous, at least for individuals of limited physical capacity.

While full bobbins are ultimately emptied and returned to the doffing machine for positioning on the spindle frame, the trip taken by bobbins after doffing varies among different textile plants, amd may vary even for a given plant operation. Because of the diversity and nature of handling operations that are encountered by bobbins in the processes of being emptied and returned to the doffing machine, it may be impractical to maintain them in a common orientation. It is therefore usually necessary to realign bobbins in a common end-to-end orientation required by the automatic doffing machine.

Examples of prior art devices for sorting, orienting, and feeding bobbins are disclosed, for example, in U.S. Pat. Nos. 2,886,940; 3,031,059; and 3,712,451.

SUMMARY OF THE INVENTION

The invention provides a bobbin feeding and sorting device particularly suited for a doffing machine which accepts uniformly aligned bobbins at an elevated feed station. The bobbin handling apparatus of the invention incorporates a vertical feed path which conserves floor space and conveniently provides a low receiving station and an elevated delivery station to the loading zone of the doffing machine. Thus, boxes of empty bobbins may be readily positioned on the device at or near floor level with minimum physical effort.

In accordance with an important aspect of the invention, the handling device is adapted to handle bobbins of random end orientation by accepting bobbins of one orientation and automatically rejecting those of the opposite orientation. Rejected bobbins are reversed end-for-end and then returned to a supply station. The apparatus includes a mechanical sensor for determining the end orientation of successive bobbins and an ejector mechanism responsive to the sensor for causing bobbins of the wrong orientation to be directed into a return path parallel to the vertical feeding path. Means are provided within the return path to change the orientation of rejected bobbins before they re-enter the supply station. As disclosed, the orientation reversing means includes a stationary surface disposed in the return path to arrest one end of the rejected bobbins, moving originally in free fall translation, to produce a rotation inducing contact. Further along the return path is a rotation-arresting surface in the form of an inclined shelf which limits rotation of the bobbins to a half-turn end-for-end and, by its inclination, permits the reversed bobbin to be gravity fed to the supply station.

Another important aspect of the invention is a bobbin storage box or magazine which is separable from the structure of the conveying and reorienting mechanism and which, preferably, is provided in a plurality of units which, when emptied, may be exchanged with an identical full unit. The disclosed box may be be advantageously used both for inter- and intra-plant transit of empty bobbins, and is constructed and arranged to be coupled to the handling apparatus by a simplified connection in the form of interlocking hook and pin coupling means.

DESCRIPTION OF THE PREFERRED EMBODIMENT

Figure 1:
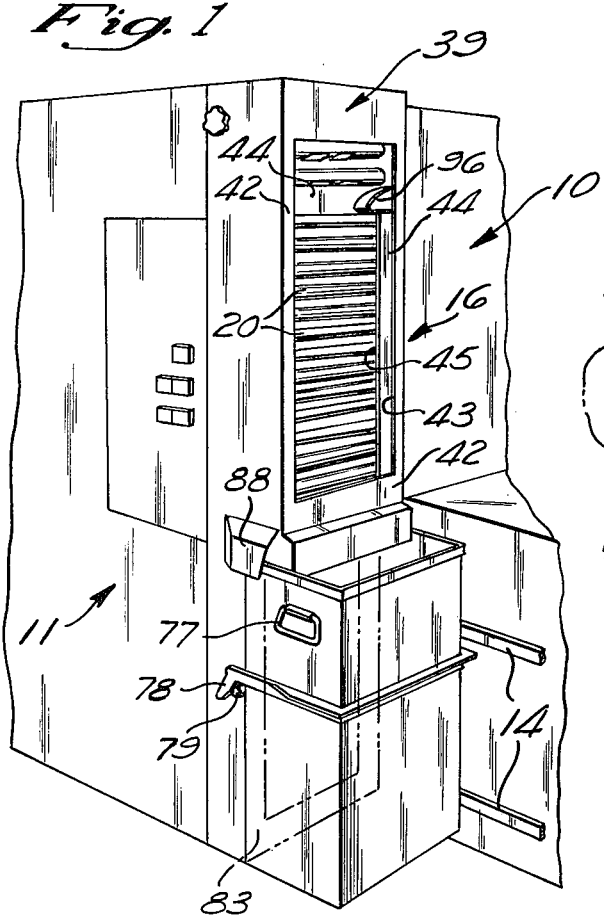
FIG. 1 is a fragmentary, perspective view of sections of a spinning frame and an associated automatic doffing unit on which the bobbin sorting and loading apparatus of the invention is mounted.
Figure 4:
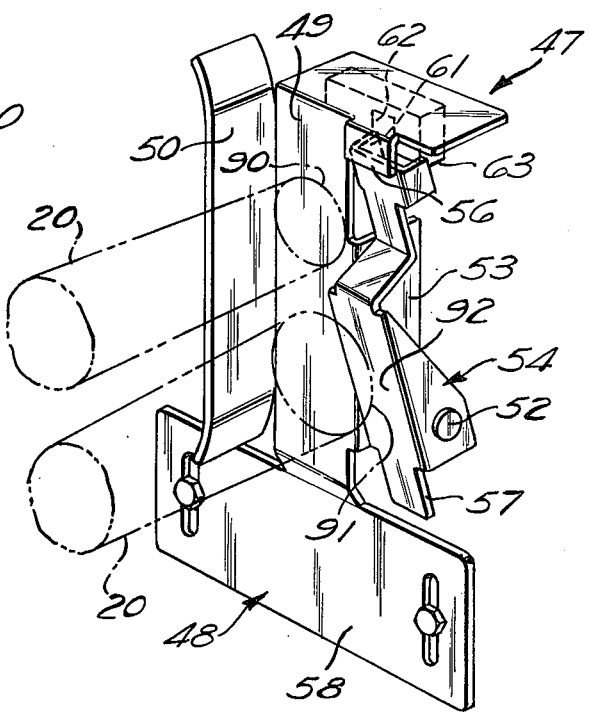
FIG. 4 is a perspective view of a mechanical sensor of the invention for detecting the end orientation of bobbins.
Figure 6:
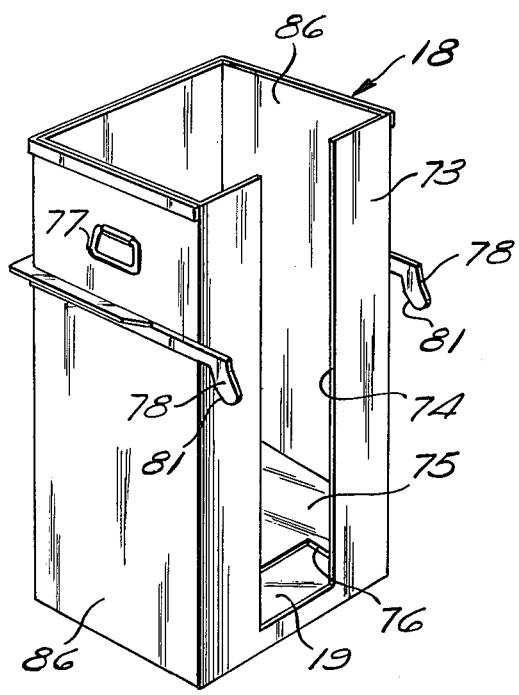
FIG. 6 is a perspective view of an empty bobbin box for transporting bobbins and for cooperating with the bobbin handling apparatus of the invention at a supply station thereof.

Referring now to the drawings, at one end of a textile spinning frame 10 is shown an automatic doffing machine 11 for removing full bobbins at successive spindle stations of the frame and replacing them with empty bobbins. The spinning frame 10 and doffing machine 11 are of known construction. The doffing machine 11 is supported on rollers 13 (FIG. 3) engaging a pair of vertically disposed rails 14 on the spinning frame 10 which guide the machine in a path parallel to the length of the spinning frame. Bobbin handling apparatus, generally designated at 16, is mounted on the doffing machine 11 and traverses alongside the spinning frame 10 in unison with it.

Figure 2:
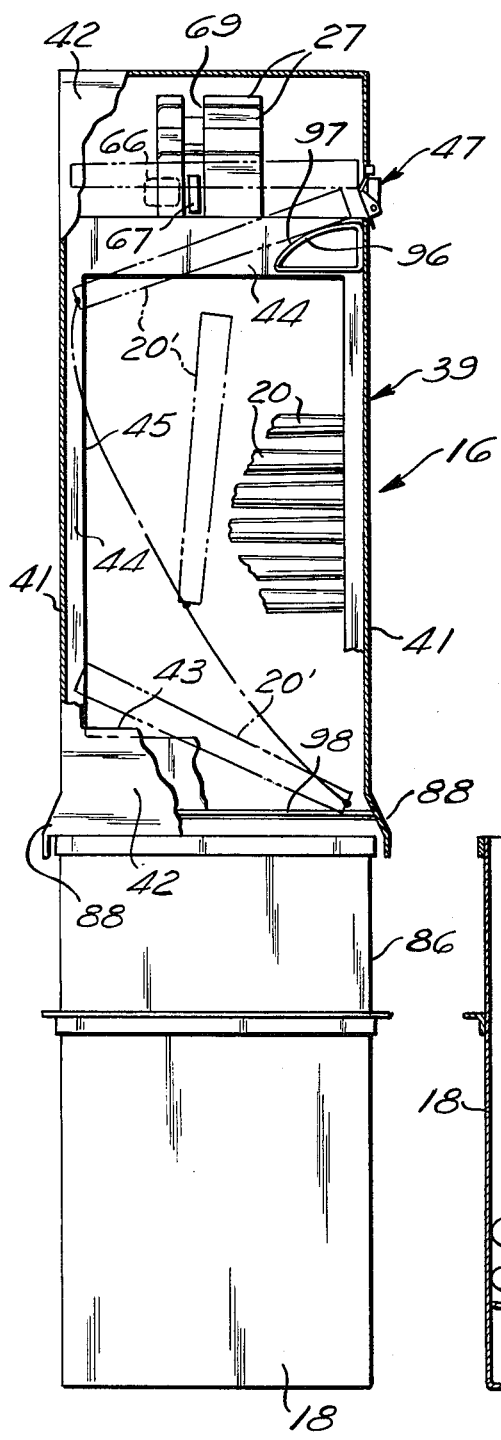
FIG. 2 is a front elevational view, partially in section, of the sorting and loading apparatus.
Figure 3:
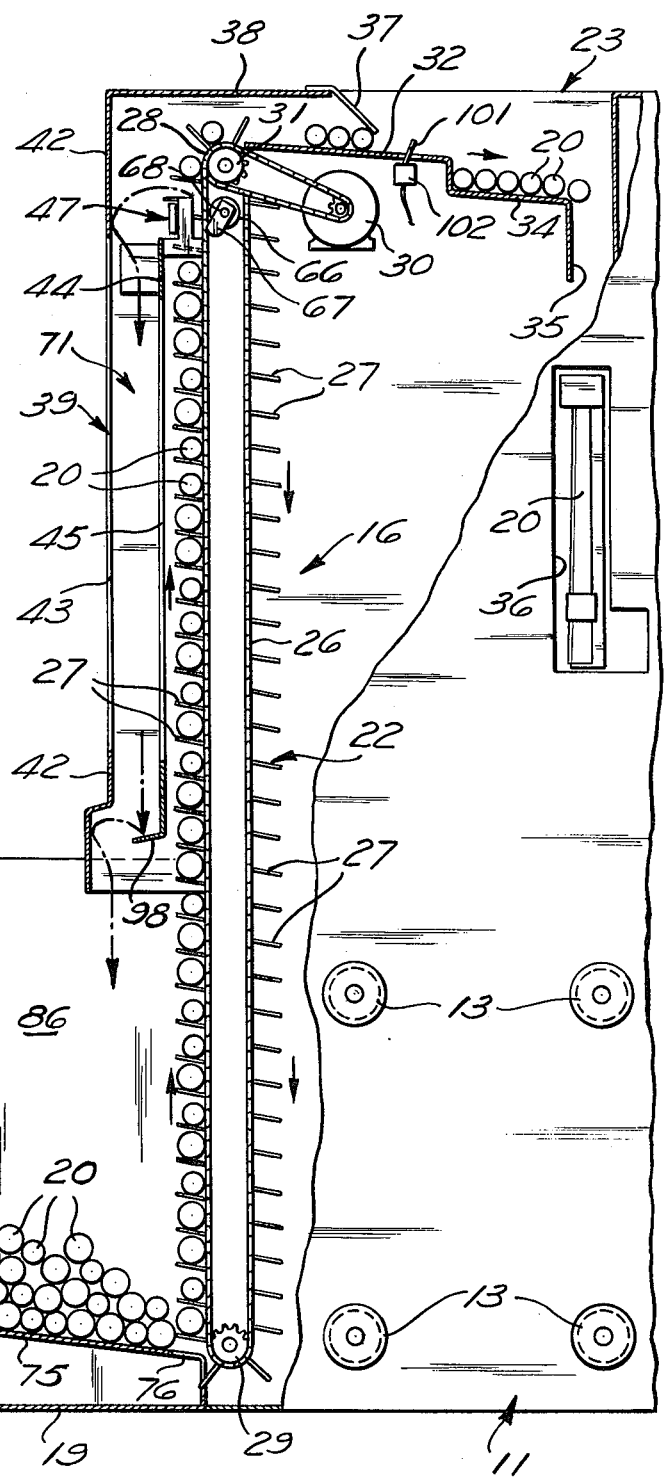
FIG. 3 is a side elevational view in cross section of the sorting and loading apparatus.

Referring particularly to FIGS. 2 and 3, a supply station for bobbins is provided by a box 18, a bottom 19 of which is immediately above floor level. The box 18 carries a supply of empty bobbins 20 which in operation of the apparatus 16 are elevated by a feed conveyor 22 to a delivery station, indicated generally at 23, at the upper level of the doffing machine 11. The conveyor 22 comprises an endless loop of chain 26 on which are fixed bobbin carrier buckets 27 spaced with sufficient clearance between one another to permit entry therebetween of bobbins 20. The chain 26 and buckets 27 are supported on a pair of vertically spaced sprockets 28 and 29 so that the conveyor 22 operates in substantially vertical planes. The upper sprocket 28 is driven by an electric motor 30, or other rotary power source, through an associated clutch 31, which may be of the electrically energized type.

At the upper end of the conveyor 22, bobbins are received from the conveyor on an inclined platform 32. Under the influence of gravity, bobbins 20 roll to the delivery station 23 formed by a sloped tray 34 feeding a chute 35 of the doffing machine. Conventional feeding means (not shown) operates through an aperture 36 (FIG. 3) in a side of the doffing machine cabinet facing the spinning frame 10. A flexible sheet 37, of plastic or other suitable material, depends into the path of the bobbins 20 on the platform 32, and has sufficient width in the axial direction of the bobbins to prevent the bobbins from skewing while not significantly retarding movement of the bobbins along the platform 32 to the delivery station 23. The sheet 37 is secured to an upper panel 38 of an enclosure 39 of the handling apparatus 16.

The enclosure 39 or support structure is a generally rectangular, boxlike structure of sheet material, for example, of medium gauge steel, and includes vertical sidewalls 41 and a front wall 42 provided with a large rectangular opening 43. Within the enclosure 39, there is disposed a vertical panel 44 spaced from the front enclosure wall 42 and immediately adjacent the path of the elevating section of the conveyor 22. The panel 44 has a relatively large aperture 45, generally coextensive with the opening 43 of the front wall 42. The openings 43 and 45 permit visual inspection of the conveyor 22 and a return path of rejected bobbins, to be described, and access to such areas to clear any jammed bobbins.

The apparatus 16 is adapted to feed bobbins 20 of random end orientation from the supply box 18 and sort those of one orientation from the other by rejecting and reorienting bobbins of the other end orientation. Bobbin ends are sensed by a detector gate assembly 47 which is nonresponsive to bobbins aligned with their head or smaller ends on a side of the conveyor 22 with which the assembly is associated, while it is responsive to bobbins having their large or butt ends at this conveyor side. The gate assembly 47 includes a support bracket 48 stamped from steel sheet stock, or otherwise fabricated. The bracket includes a bobbin end face guide surface 49 and a perpendicular bobbin side face guide surface 50. A horizontal pivot pin 52 is fixed to an integral tab 53 of the bracket 48.

Figure 5:
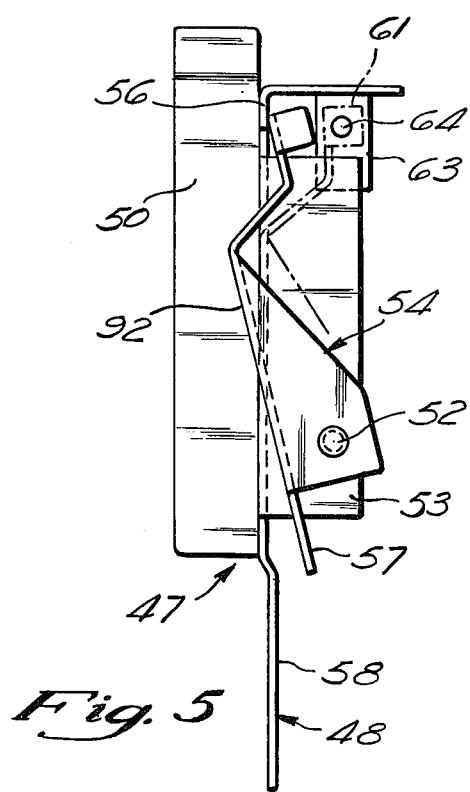
FIG. 5 is a side view of the sensor of FIG. 4.

A bobbin end detector lever 54 is pivotal on the pin 52 between the solid line and phantom positions of FIG. 5, with movement beyond these positions being limited by engagement of an upper end of the lever 54 with a downwardly bent tab 56 of the bracket 48 and engagement of an integral extension 57 of the lever 54 with a lower portion 58 of the bracket. A tab 61 of the lever 54 is adapted to move into a throat 62 of an inverted, U-shaped photocell assembly 63 and interrupt a light beam, schematically illustrated at 64 in FIG. 5, to produce an electrical signal in a known manner. The lever 54 is gravity-biased from the phantom position to the solid-line position of FIG. 5, since its center of gravity is to the left of the pivot pin 52.

A rotary solenoid 66 is fixed by suitable means within the conveyor chain loop immediately under the upper sprocket 28. A kicker arm 67 is fixed to a horizontal rotary output shaft 68 of the solenoid 66 at approximately the same vertical level as the detector lever 54. Upon energization of the solenoid 66, the arm 67 is rapidly rotated from its position in FIG. 3 in a clockwise direction through a limited angle sufficient to knock off or reject a bobbin 20 from a conveyor bucket 27, moving through the gate assembly 47. Each of the conveyor buckets 27 is provided with a slot 69 through its vertical portion and partially through its inclined lower portion to provide clearance for the kicker arm 67. The solenoid 66 is responsive to the photocell 63 through suitable conventional control circuitry to reject bobbins 20 of one end orientation by displacing them from the conveyor 22. Rejected bobbins fall through a vertical path or chute 71 immediately adjacent the vertical feed path of the conveyor, and are thereby returned to the supply box 18.

The supply box 18 is rectangular in configuration and, as shown, is relatively deep in comparison with its width, i.e., the lengthwise direction of the bobbins, and its length. A lengthwise end wall 73 of the box 18 is provided with a rectangular slot 74 substantially through its full height to provide clearance for the conveyor buckets 27 when the box is installed on the enclosure 39. The box 18 includes a false bottom 75 sloped to provide a gravity feed of bobbins 22 towards the end wall 73 and conveyor 22. The bottom 75 is provided with a slot or notch 76 in communication and in alignment with the vertical notch 76, also for purposes of clearance of the conveyor buckets 27, most clearly seen in FIG. 3. A pair of handles 77 are secured to opposite sides of the box 18 to permit manual handling and loading of the box on the enclosure 39. A pair of hooks 78 are formed on opposite sides of the box 18 for mounting to the enclosure 39 by cooperation with a pair of pins 79 fixed to the enclosure. The hooks 78 depend from a stiffening perimeter frame conveniently fabricated from steel angle stock and welded to the steel sheet stock forming the walls of the box 18. The hooks 78 include wedging surfaces 81 inclined somewhat from the vertical to cause the face 73 of the box to be drawn tightly by gravity against a corresponding enclosure face 83, illustrated in phantom in FIG. 1.

In operation, a box 18 containing a supply of bobbins 20 is attached to the enclosure 39 of the apparatus by manually lifting and then lowering the box against the enclosure wall 83 to cause the pins 79 to enter the throats of the hooks 78. Interaction between the pins 79 and camming surfaces 81 of the hooks 78 causes the box to be locked in position against the enclosure with a minimum of manual effort and in a self-aligning manner.

The conveyor 22 is energized to enable the buckets 27 to move vertically through the box 18 to pick up bobbins 20 of random end orientation. The bobbins 20 are raised in a substantially vertical path and are retained in individual buckets 27 by the slanted orientation of the lower sides of the buckets. The bobbins 20 are restrained in their axial direction by the inner surfaces of the box sidewalls, designated 86, and the coplanar inner surfaces of the enclosure sidewalls 41. Angularly disposed skirts 88 at opposite sides of the enclosure guide the ends of bobbins 20 in the transition area between the box 18 and enclosure 39 (FIG. 2).

The detector assembly 47 is mounted on the enclosure 39 such that the bracket surface 49 is substantially coplanar with the inner surface of the adjacent enclosure sidewall 41, while the bracket surface 50 is substantially coplanar with the path of the vertical portions of the conveyor buckets 27. The spacing of the lever 54 from the surface 50 is such that the small end, designated 90, of a bobbin may pass vertically between these elements, completely avoiding the lever. However, the lever 54 is spaced from the surface 50 and is dimensioned such that the large end, designated 91, of a bobbin as it is elevated past the detector assembly 47, engages a face 92 of the lever 54 to cam the lever outwardly in a direction along the axis of the bobbin, or clockwise about the pivot pin 52, as viewed in FIG. 5. The interior surface of the enclosure sidewall 41 opposite to that on which the detector assembly 47 is mounted prevents significant axial movement of the bobbins on their respective buckets to thereby ensure that the lever 54 will be operated whenever the large or butt end 91 of a bobbin passes the detector assembly 47. As previously indicated above, the lever tab 61 intercepts the light beam of the photocell 63 when the lever 54 is displaced. Suitable electrical circuitry associated with the photocell momentarily energizes the kicker solenoid 66, causing the kicker arm 67 to rotate and strike the midsection of the relevant bobbin having its butt end in the detector assembly 47. The bobbin is directed horizontally into the return chute 71 (FIG. 3) to permit it to begin falling in a vertical path substantially in translation. Horizontal movement of the bobbin is restrained by the inner surface of the front enclosure wall 42.

A bobbin inverter 96 is disposed at one side of the return path slightly below the plane of the detector assembly 47 and kicker arm 67. The inverter 96 includes an arcuate upper surface covered or formed by a high friction material, such as neoprene or polyurethane. The inverter 96 arrests one end of a rejected bobbin falling through the chute 71 to induce rotation of the bobbin end-for-end about a horizontal axis. While the inverter 96 is disposed on the side of the chute 71 associated with the detector assembly 47 so as to arrest the butt end of a bobbin, it will be understood that, alternatively, the inverter 96 may be employed on the opposite side of the chute. A rejected bobbin 20' falls through a path of movement, indicated in sequence in FIG. 2, with the head end leading the butt end in the initial and midportions of the fall and with the butt end tending to catch up vertically with the head end towards the final phase of the fall. The bobbin 20' contacts a fall arresting ledge 98 integral with the vertical panel 44. The ledge 98 is inclined slightly from the horizontal to allow the bobbin 20' to roll off its free edge and drop into the box 18, now with a reversed orientation which will not cause it to be rejected at the detecting station. The ledge 98 is spaced intermediate the inverter 96 and the supply box 18 at a predetermined distance from the inverter which permits approximately 180° end-for-end bobbin rotation but is sufficiently close to the inverter so as not to risk 360° end-for-end rotation.

A sensing finger 101 of a limit switch 102 is disposed in the path of the bobbins on the delivery platform 32 to sense when an adequate stack of bobbins is stored at the delivery station 23 and to interrupt power to the conveyor 22 as by de-energizing the clutch 31. The conveyor 22 is automatically restarted when the finger 101 is released.

While the invention has been described in connection with specific embodiments thereof, it is to be clearly understood that this is done only by way of example, and not as a limitation to the scope of the invention as set forth in the objects thereof and in the appended claims.

What is claimed is:

1. A mechanism for sorting head and butt ends of a succession of bobbins, comprising means for conveying bobbins along a path in spaced parallel relation to one another and transversely aligned to the conveying direction, mechanical sensor means at one side of the bobbin path, said sensor means being arranged relative to the bobbin conveyor path to be displaced in the axial direction of the bobbins by the adjacent butt ends of the bobbins and arranged to avoid being displaced by the adjacent head ends of the bobbins, means responsive to displacement of said sensor means to reject bobbins of one head or butt orientation from the conveying means.

2. A mechanism as set forth in claim 1, wherein said ejecting means includes means to eject said bobbins of one orientation in a direction perpendicular to said conveying path.

3. A mechanism as set forth in claim 2, wherein said conveying means comprises a continuous belt supported to move in a zone adjacent said path, said ejector means being arranged to eject said bobbins of one orientation in a direction away from said belt.

4. Apparatus for reversing a succession of bobbins end for end, comprising means for directing bobbins into a path of translational movement in spaced parallel relation to one another and transversely aligned to the direction of said path, means in said path at one side thereof arranged to retard movement of one end of each bobbin relative to the movement of an opposite end of the bobbin to impart a rotational movement, means spaced from said end retarding means to arrest the rotational movement of said bobbins after they have reversed end for end, said arresting means including means to engage at least the surfaces of each end of each of said bobbins to arrest its rotational movment along said path, said path being substantially vertical, said bobbin directing means being arranged to permit said bobbins to fall vertically through said path under the influence of gravity, and restraining means along said path, said directing means being arranged to move said bobbins horizontally against said restraining means, said restraining means being arranged to guide said bobbins vertically through said path from said directing means to said rotation arresting means.

5. Apparatus for handling bobbins comprising a supply station for holding a multiplicity of empty bobbins of predetermined length stacked upon one another in parallel relation with their ends in registration and in random orientation, said supply station having a vertical side, means for feeding said bobbins in single file from said supply station in a path transverse to their axes, sorting means for rejecting all of the bobbins of one end orientation and accepting all of the bobbins of the other orientation, means for reversing the orientation of all of the rejected bobbins and means for returning all of the reoriented, rejected bobbins directly to said supply station in their reoriented state, said bobbin returning means including a rejected bobbin return path between said sorting means and said supply station, said return path including restraining means along said return path, said feeding means being arranged to feed bobbins in a substantially vertical path from said vertical side of said supply station, said restraining means of said return path being generally parallel to the vertical feed path and including surfaces arranged along a substantially vertical free fall zone extending from said sorting means to said supply station and in which rejected bobbins are confined and thereby caused to return to said supply station subsequent to their rejection under the influence of gravity, said bobbin reversing means being disposed in said return path whereby movement of rejected bobbins during reversing movement and subsequent return to the supply station are substantially limited to a vertical plane.

6. Apparatus as set forth in claim 5, wherein said supply station comprises a removable rectangular box, opposite sides of said box being spaced a distance slightly greater than the length of said bobbins whereby said bobbins are maintained in end-to-end alignment by said spaced sides.

7. Apparatus as set forth in claim 6, wherein a vertical side of said supply box is notched to receive said feeding means.

8. Apparatus for reversing a succession of bobbins end for end, comprising means for directing bobbins into a substantially vertical path of translational movement in spaced parallel relation to one another and transversely aligned to the direction of said path by permitting said bobbins to fall vertically through said path under the influence of gravity, means in said path at one side thereof arranged to retard movement of one end of each bobbin relative to the movement of an opposite end of the bobbin to impart a rotational movement, and means spaced from said end retarding means to arrest the rotational movement of said bobbins after they have reversed end for end, said arresting means including means to engage at least the surfaces at each end of each of said bobbins to arrest its rotational movement along said path, restraining means along said path, said directing means being arranged to move said bobbins horizontally against said restraining means, said restraining means being arranged to guide said bobbins through said vertical path from said directing means to said rotation arresting means, said rotation arresting means including a surface extending transversely into said path and being inclined with respect to the horizontal to allow bobbins to be moved off said surface by the influence of gravity.

* * * * *